United States Patent [19]
Ferguson

[11] Patent Number: 6,085,595
[45] Date of Patent: Jul. 11, 2000

[54] HIGH RANGE PRESSURE SENSOR FOR PRESSURE GAUGE

[75] Inventor: Walter J. Ferguson, Waterbury, Conn.

[73] Assignee: Dresser Industries, Inc., Dallas, Tex.

[21] Appl. No.: 09/182,844

[22] Filed: Oct. 29, 1998

[51] Int. Cl.$^7$ .............................. G01L 7/02; G01L 7/10
[52] U.S. Cl. .............................................................. 73/730
[58] Field of Search .......................... 73/152.51, 152.59, 73/708, 730, 756, 731; 166/53, 65.1, 250.07, 374; 241/69, 172

[56] References Cited

U.S. PATENT DOCUMENTS

| | | |
|---|---|---|
| 13,468 | 8/1855 | Mathews . |
| 1,416,814 | 5/1922 | Glickerman ................................ 73/731 |
| 1,421,501 | 7/1922 | Kraft et al. . |
| 2,409,161 | 10/1946 | Siyertsen . |
| 3,556,044 | 1/1971 | Egresits ...................................... 73/731 |
| 3,561,330 | 2/1971 | Rich . |
| 3,924,519 | 12/1975 | England . |
| 4,262,529 | 4/1981 | Rosenblatt et al. ........................ 73/730 |
| 4,730,789 | 3/1988 | Geiger ........................................ 241/69 |
| 4,875,368 | 10/1989 | Delatorre .............................. 73/152.51 |
| 5,083,498 | 1/1992 | Sato et al. . |
| 5,490,564 | 2/1996 | Schultz et al. ........................... 166/324 |

*Primary Examiner*—William Oen
*Attorney, Agent, or Firm*—Daniel Rubin

[57] ABSTRACT

A sensor element suitable for sensing pressure values of fluid pressure at high pressure ranges on the order of 40,000 psi and above and comprised of a predetermined length of a closed end tube which at zero applied pressure is of rectilinear configuration. The tube contains a round bore eccentrically disposed parallel within the tube having one end open at which to receive fluid pressure. By virtue of the eccentric relationship of the bore to the tube, an internal bending moment occurs under pressure loading that is proportional to the applied pressure and which bending moment causes the free closed end of the tube to deflect in a direction opposite to the direction to the which the bore was predisposed with respect to the OD center line of the tube. In a preferred embodiment, the unsupported free length of the tube is at least about 20 times the tube OD and for operating at the high pressure ranges, the tube is of a metal composition characterized by relatively high tensile yield strength in combination with a relatively low Young's elastic modulus. Various applications for use of the tube are disclosed including a pressure gauge, switch mechanism, etc.

17 Claims, 5 Drawing Sheets

RI = .065
R2 = .110
E = .02
MODULUS = 8.5E5 PSI
P = 4000 PSI

| r1 (inch) | tip travel (mills) | stress (ksi) |
|---|---|---|
| 0.06 | 57.2 | 142.3 |
| 0.065 | 77.8 | 171.6 |
| 0.07 | 108.8 | 219.1 |

| r2 (inch) | tip travel (mills) | stress (ksi) |
|---|---|---|
| 0.1 | 106.9 | 204.7 |
| 0.105 | 77.8 | 171.6 |
| 0.11 | 58.9 | 154.3 |

| eccentricity (inch) | tip travel (mills) | stress (ksi) |
|---|---|---|
| 0.01 | 50.7 | 151.5 |
| 0.015 | 77.8 | 171.6 |
| 0.02 | 108.9 | 201.6 |

| bore length (inch) | tip travel (mills) | stress (ksi) |
|---|---|---|
| 6 | 60.4 | 171.7 |
| 7 | 77.8 | 171.6 |
| 8 | 97.9 | 174.5 |

| Arm I Length (inch) | tip travel (mills) | stress (ksi) |
|---|---|---|
| 1 | 70.5 | 171.6 |
| 2 | 77.8 | 171.6 |
| 3 | 88.4 | 171.6 |

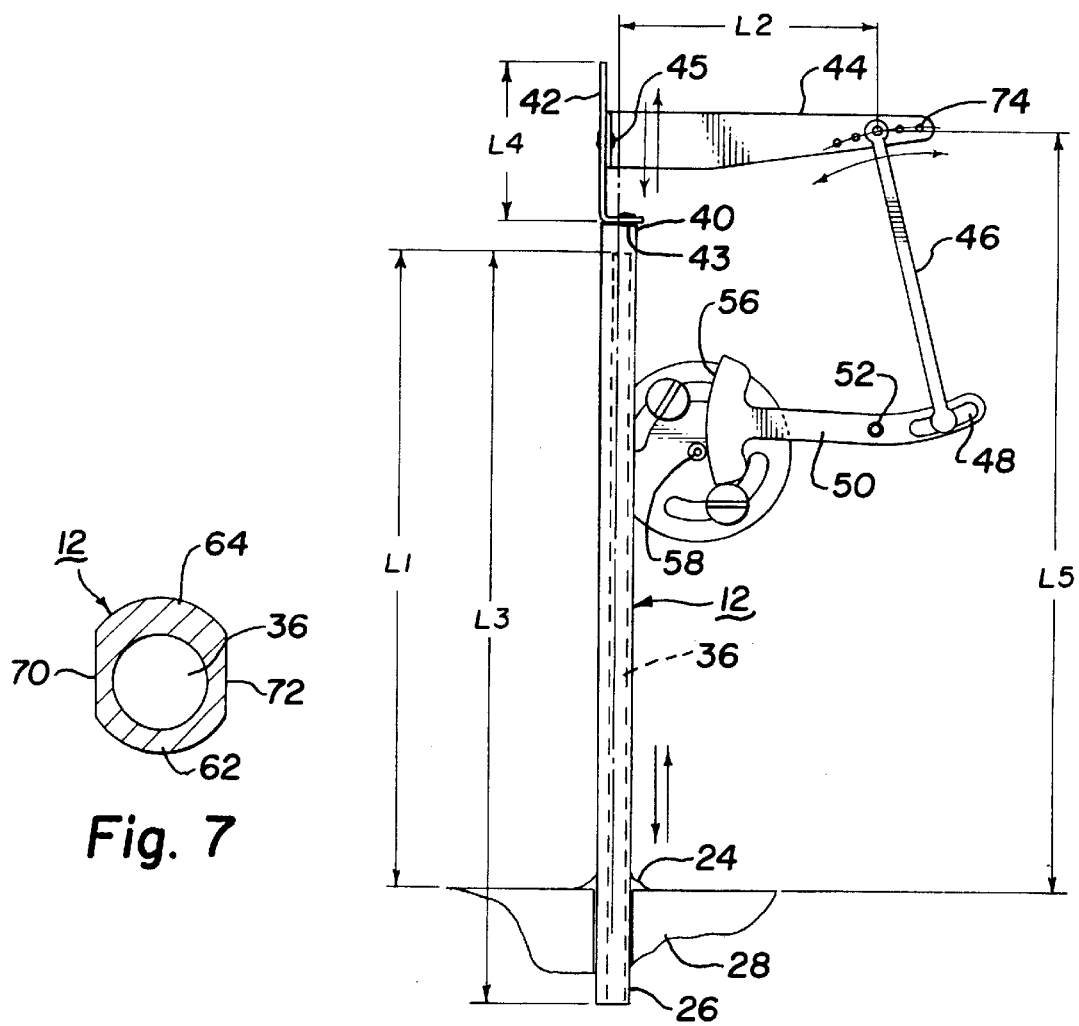
Fig. 7
Fig. 8
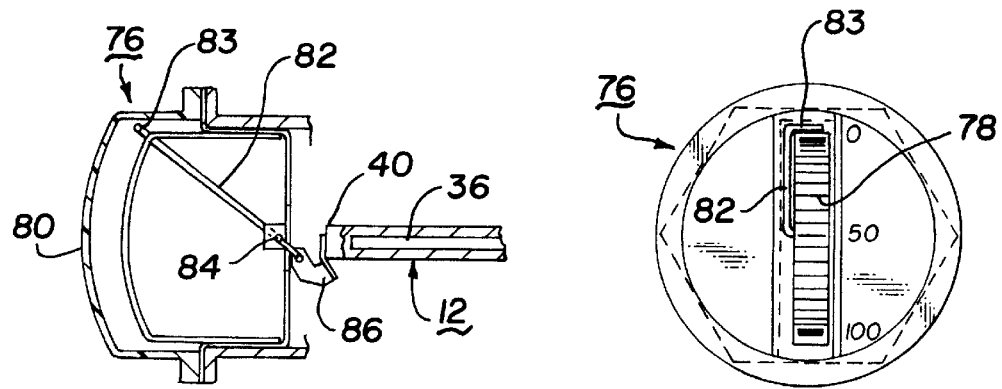
Fig. 9
Fig. 10

HIGH RANGE PRESSURE SENSOR FOR PRESSURE GAUGE

FIELD OF THE INVENTION

The field of art to which the invention relates comprises the art of pressure gauges suitable for high range sensitivity generally in excess of about 40,000 psi.

BACKGROUND OF THE INVENTION

Pressure gauges are widely utilized in a myriad of different environments for commercial and industrial applications where affording an indication of fluid pressure values is required. Depending on the instrument, values of pressure can be displayed in either digital or analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values. The sensing element, whether it be a Bourdon tube, diaphragm assembly, etc. is selected to withstand the highest pressure for which the gauge is intended. Encountered pressure values above approximately 40,000 psig are regarded as high pressure for which high pressure sensing elements of appropriate capacity are required.

DESCRIPTION OF THE PRIOR ART

The majority of pressure gauges for a variety of industrial applications are operable within pressure ranges on the order of up to about 10,000 psi. High pressure gauges operable above about 40,000 psi typically deploy Bourdon tubes featuring 1.5–10 turns of sensing tube. Alternatively, wire frequency gauges are utilized deploying a fine wire tensioned proportionately to the applied pressure by virtue of an elastic deformation. A mechanism operates to pluck the wire and force it into its resonant frequency from which an electrical signal is emitted. Consumer demand for gauges in the higher pressure ranges are relatively rare as compared to the market as a whole, such that production rates are less than optimum and which in turn cause costs and prices therefor to be relatively high.

Sensing elements, sometimes referred to as "actuators" in the form of a cylindrical tube, are known and disclosed for example in U.S. Pat. Nos. 13,468; 1,421,501; 2,409,161; 3,561,330; 3,924,519 and 5,083,498. While appearing to operate well for their intended end purposes, they are generally characterized by virtue of specific details of their construction as most suitable for low pressure applications of 5000 psi or less and therefore unsuitable for the purpose of comprising the sensor in a pressure gauge affording high pressure sensitivity.

Despite recognition of the problem, it has not been known heretofore how to manufacture a relatively low cost sensor for a pressure gauge operable in the high pressure range.

OBJECTS OF THE INVENTION

It is therefore an object of the invention to provide novel sensor apparatus for sensing values of fluid pressure in high pressure applications in excess of about 40,000 psi.

It is a further object of the invention to effect the previous object with a sensor element capable of operating in a variable pressure environment for translating changes in pressure to which it is exposed to the visual indicator of a pressure gauge or other utilization apparatus.

It is a still further object of the invention to produce a sensor as in the previous objects for which the manufacturing cost of the sensor element is relatively low as compared to similar purpose sensor elements of the prior art.

SUMMARY OF THE INVENTION

This invention relates to a sensor for sensing pressure values of fluid pressure generally in excess of 40,000 psi. More specifically, the invention relates to a novel construction of a high pressure sensor element able to withstand and reliably translate values of high pressure to which it is exposed to various forms of utilization apparatus such as a pressure gauge, pressure switch, etc.

The foregoing is achieved with a predetermined length of a closed end tube which at zero applied pressure is of rectilinear configuration. The tube contains a round bore eccentrically disposed within the tube. The tube is secured and open at one end at which fluid pressure is received while it is unsupported and closed at a free end for lateral displacement in response to fluid pressure entering the supported end. The eccentric bore is typically drawn, gun drilled from rod or eccentrically turned as by a lathe. The eccentric relationship of the bore causes an internal bending moment to occur in the tube under pressure loading that is proportional to the applied pressure. Under internal pressure loading, the bending moment causes the free end of the tube to deflect in a direction opposite to the direction in which the bore was predisposed with respect to the OD centerline of the tube. In a preferred embodiment, the unsupported free length of the tube is at least about 20 times the tube OD and to operate at the contemplated high pressure is constructed of a metal composition characterized by relatively high tensile yield strength in combination preferably with a relatively low Young's elastic modulus. It can likewise be formed of engineered plastics for low pressure applications of 500–5000 psi. Since it typically relies on less motion than a typical geared movement, it is well suited for applications such as electronics.

The virtues of the above are many not least of which include: a) approximately fifty percent less tubing typically required as compared to a conventional Bourdon tube for similar purposes; b) elimination of at least three costly manufacturing operations compared to the normal manufacture of a similar purpose Bourdon tube; c) affords a tube bore terminated, but not through the free end resulting in an integral tip section for ultimate reliability; d) avoids the difficulty of forming a Bourdon tube having a truly round cross section typically required for such applications; and e) affords the opportunity to begin manufacture with a fully hardened tube or rod.

It can be appreciated that the foregoing can produce substantial cost savings in the manufacture of a sensor element compared to similar constructions currently utilized in the prior art.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 7 is a sectional view similar to FIG. 5 for an optional sectional variation;

FIG. 8 illustrates a method of calibrating sensor displacement in correlation to values of fluid pressure being received;

FIG. 9 is a schematic sectional elevation of an alternative gauge indicator; and FIG. 10 is a front elevation of the indicator of FIG. 9.

DESCRIPTION OF THE PREFERRED EMBODIMENT

Figure 1:
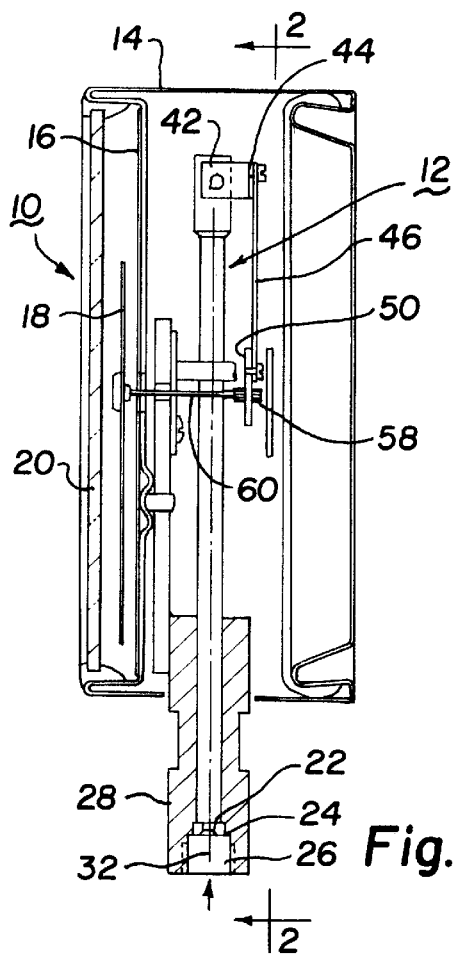
FIG. 1 is a vertical elevation partially sectioned of a pressure gauge incorporating the sensor element of the invention.

In the description which follows, like parts are marked throughout the specification and drawings with the same reference numerals respectively. The drawing figures are not necessarily to scale and in certain views, parts may have been exaggerated for purpose of clarity.

Figure 2:
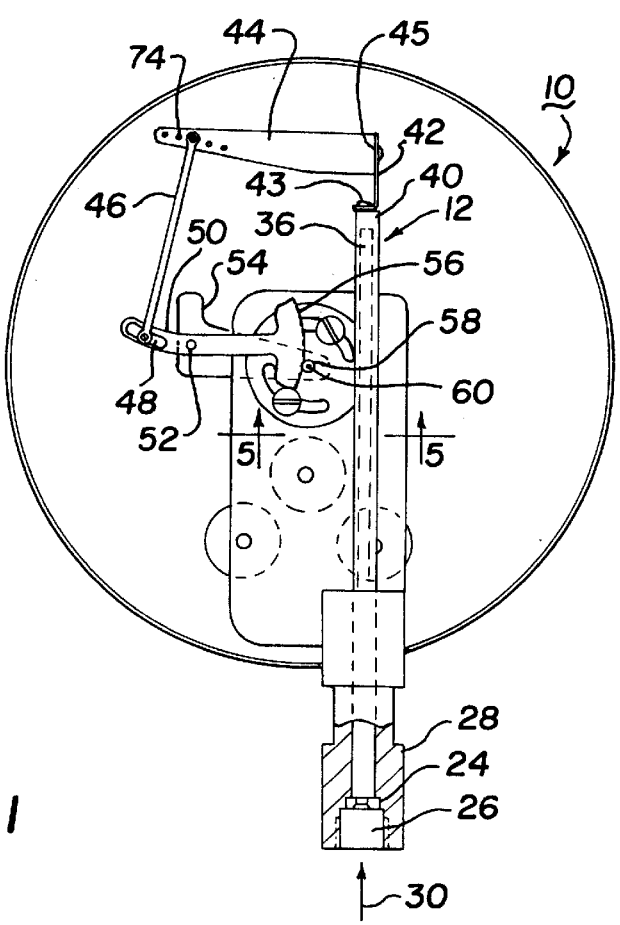
FIG. 2 is a front elevation of a pressure gauge as seen substantially along the lines 2—2 of FIG. 1.

Referring now to the drawings, there is illustrated in FIGS. 1 and 2 a pressure gauge designated 10 comprising a case or housing 14 as shown, for example, in my U.S. Pat. No. 4,545,256. Contained within housing 14 is a dial face 16 and a pointer 18 enclosed by a crystal 20 and displaceable past dial face 16. Also, contained within case 10 is a sensor element 12 in accordance with the invention hereof and comprised of straight tubing having a closed displaceable end 40. The sensor is preferably formed of a metal selected from those exhibiting relatively high tensile yield strength in combination with a relatively low Young's elastic modulus. Exemplifying such metals are Inconel 718, Inconel X-750, K-500 Monel, Inconel 706, etc. It can likewise be utilized with engineered plastic containing reinforcements of glass, graphite or minerals for operability at 500–5000 psi.

Figure 5:
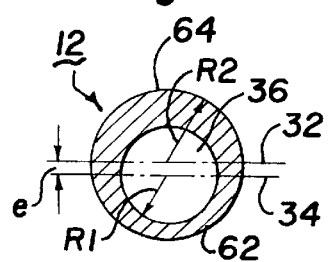
FIG. 5 is an enlarged sectional view as seen substantially along the lines 5—5 of FIG. 2.

For purpose of operation, sensor element 12 is constructed, as best seen in FIGS. 1–5 to contain a longitudinal bore 36 having a centerline 34 offset from the tube centerline 32 a distance "e" (FIG. 5). Bore 36 terminates inward of the tube at an undersurface 38 below free end 40 so as to define an integral enclosure thereat. This construction results in a relatively thin wall 62 opposite a relatively thick wall 64. (FIG. 5)

As installed in gauge 10, sensor element 12 includes a fixed or stationary end welded at 24 to a socket 28 of the gauge for providing a rigid leak proof connection to a fluid inlet 26. Socket 28 is adapted for installation in a system with which the gauge is to be utilized. Free end 40 of the sensor element is secured to a bracket 42 that in turn is secured to a lateral arm 44. The arm includes a plurality of apertures 74 one of which is selected for supporting a linkage 46 extending to elongated slot 48 of amplifier sector arm 50. Arm 50 is supported to pivot about pin 52 in a support plate 54 and at its distal end includes teeth 56 engaged with gearing 58 on pointer shaft 60. Rotation of shaft 60 causes displacement of pointer 18 opposite dial plate 16 as will be understood.

Figure 3:
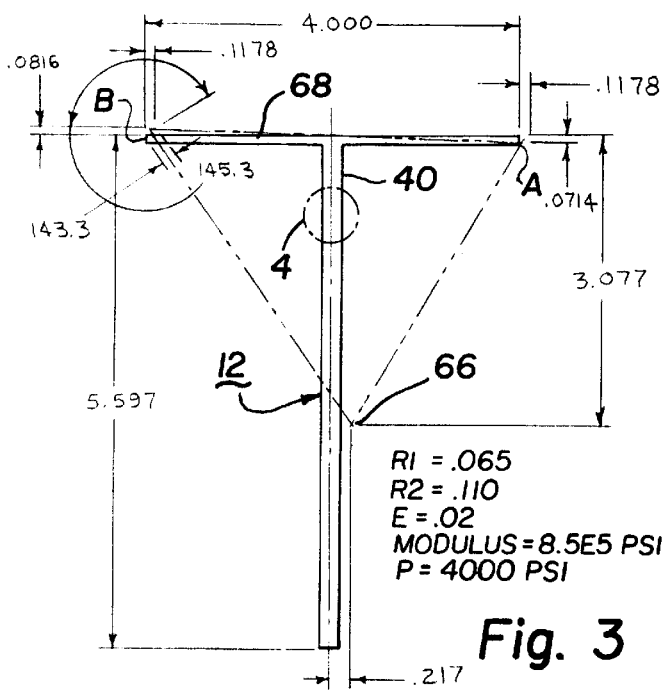
FIG. 3 is a CAD plot illustrating motion under applied pressure of a round disk rigidly attached to the free end of the tube to ascertain end location of the instantaneous center of rotation for a tube of given dimensions.
Figure 4:
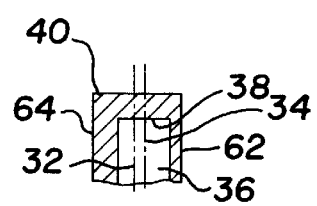
FIG. 4 is a fragmentary sectional enlargement of the encircled free end of the sensor in FIG. 3.

Referring specifically to FIG. 3, sensor 12 is illustrated in a CAD plot of a particular data set illustrating the motion of the free end 40 for locating an instantaneous center of rotation 66. To identify the instantaneous center of rotation that is necessary for selecting movement design and placement, ANSYS® software model was utilized to include a circular disk 68 attached and transversely mounted to the free end 40 of the tube.

By providing the motion magnitude and direction for two opposite points on the disk x=−0.1178 and y=0.0714 for point "A" and x=−0.1178 and y=−0.0816 for point "B" and extending them as linear vectors projecting perpendicular from the midpoint of each, it can be observed that the instantaneous center of rotation 66 is at the intersection of those two projection lines. From this it can be ascertained that while tube 12 tends to bend about weld 24, the effective motion of tip 40 is approximately half way along the longitudinal length of the tube.

Figure 6A:
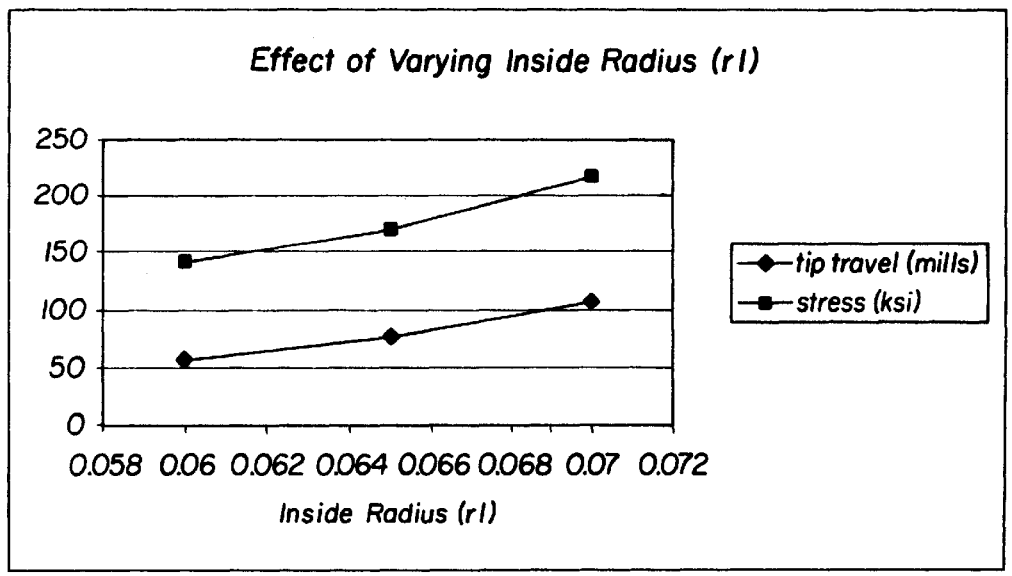
FIGS. 6a), b), c), d) and e) graphically illustrate tip travel and stress properties for various dimensional tube parameters.
Figure 6B:
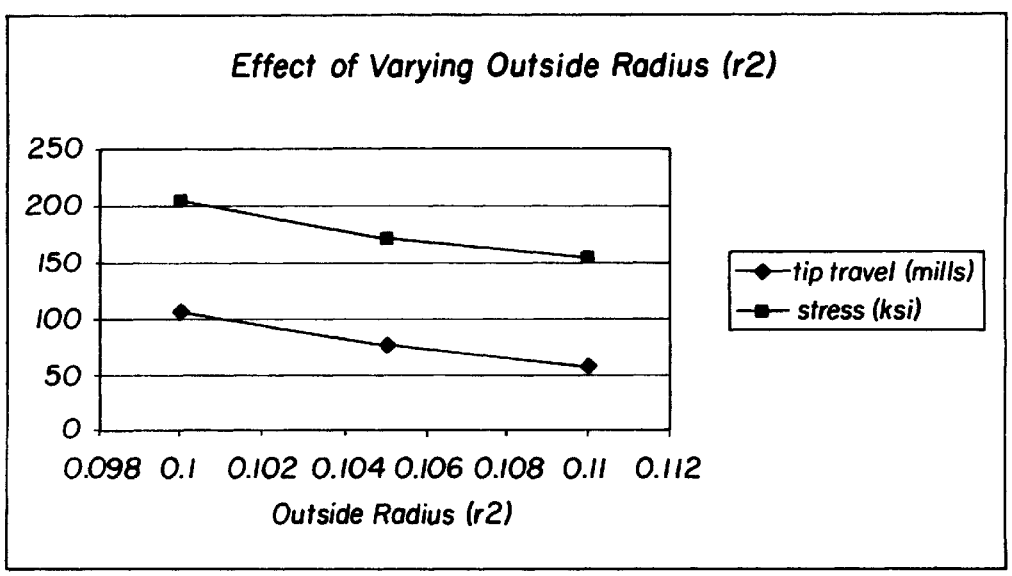
Figure 6C:
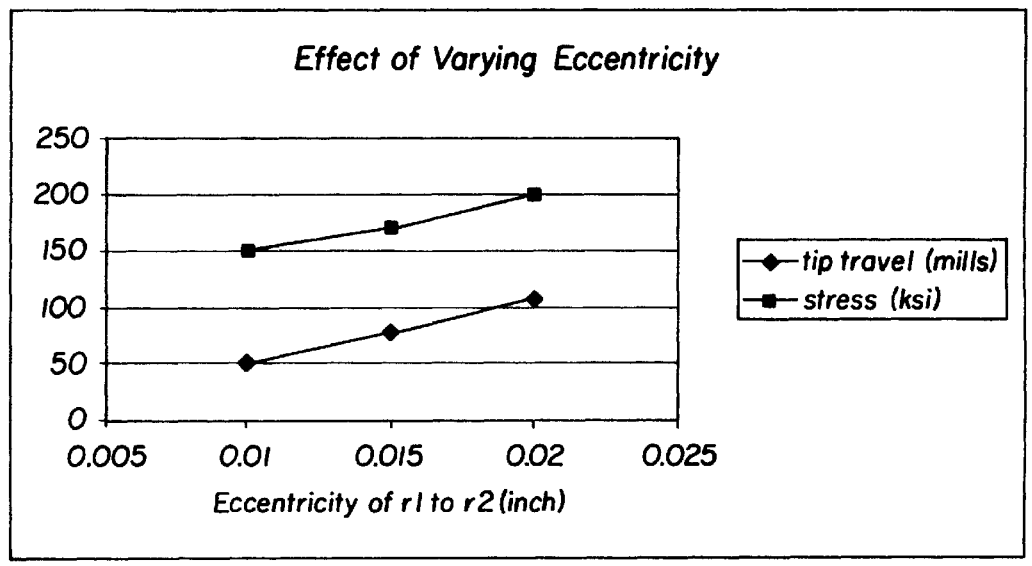
Figure 6D:
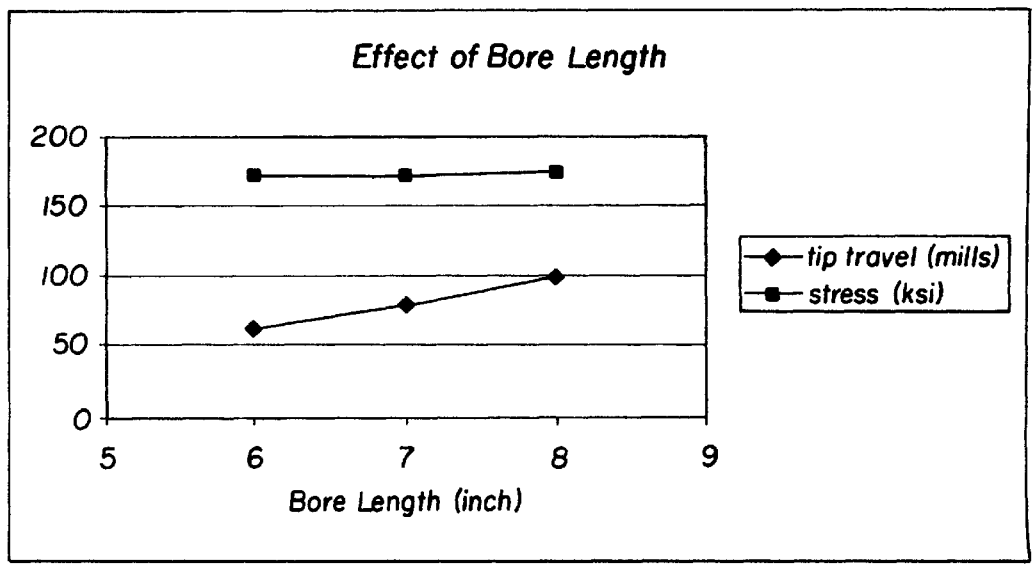
Figure 6E:
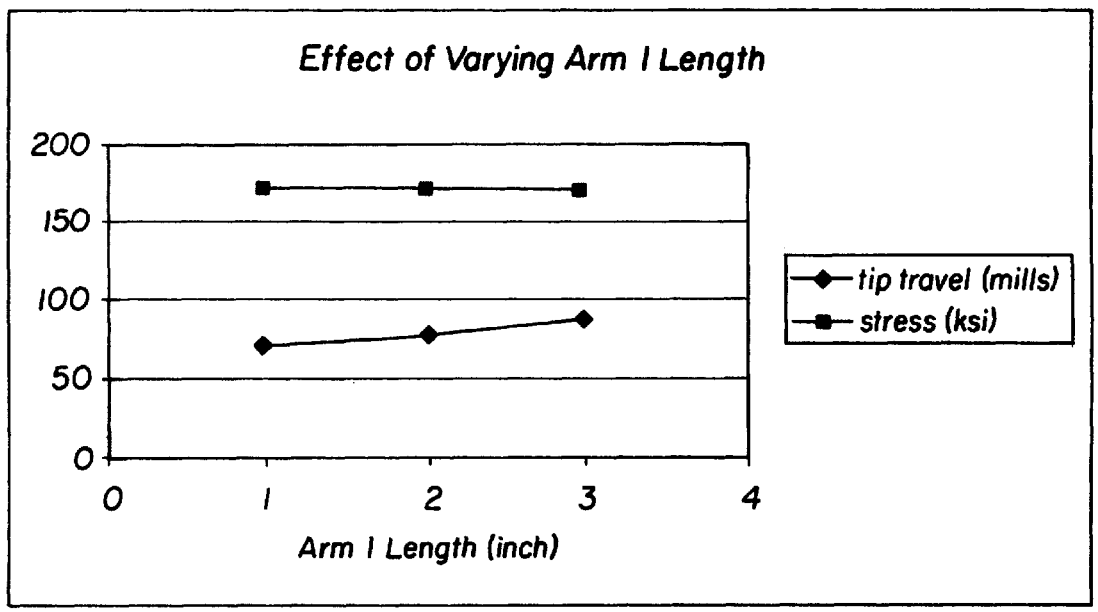

FIGS. 6a, b, c, d and e graphically illustrate five sensitivity plots in which the middle set of data represents a base line condition. All graphs were generated using Inconel 718 tubing (E=29,800,000 psi) for pressure loadings of 50,000 psi.

On the basis of this data, it can be observed that: 1) bore length has the greatest effect on free end motion; 2) varying the radius r1 and r2 and eccentricity have similar effects on sensitivity; 3) varying the length of arm 44 has the least impact on free end motion; and 4) from the stand point of stress, given a wall thickness at the thinnest point on the tube circumference it would be better to impose a greater amount of eccentrically as opposed to a greater bore size.

Found essential in the construction of sensor 12 for the express purposes hereof are the following dimensional parameters:

1) the length of tube 12 to the outside diameter of tube 12 (OD) is preferably in the ratio of from about 30–60/1;
2) the internal diameter (ID) of tube 12 to the tube (OD) should be in the ratio preferably from about 35% to 65%/1;
3) the offset of bore centerline 34 to the internal diameter (ID) of bore 36 of the tube should preferably be in the range from about 15% to 40%/1.

As noted previously, materials of construction for sensor element 12 requires a selected composition having a relatively high tensile yield strength in combination preferably with a relatively low Young's elastic modulus. For commercial applications targeted for pressures in excess of 40,000 psi, potential yield strength should be at least about 150,000 psi and the modulus should ideally be about 26,000,000 psi. Suitable for these purposes are the materials and properties listed below subject to qualifications to be noted:

| Material | Tensile Yield Strength (psi)* | Modulus of Elasticity (psi) |
| --- | --- | --- |
| Inconel 718 | 181,000 | 29,800,000 |
| Inconel X-750 | 163,000 | 31,000,000 |
| K-500 Monel | 150,000 | 26,000,000 |
| Inconel 706 | 143,000 | 30,400,000 |
| Beryllium Cooper | 182,000 | 18,500,000 |
| 316 Stainless Steel | 42,000 | 28,000,000 |
| 7075-T6 Aluminum | 73,000 | 10,400,000 |

*age hardened if applicable

Lower strength metals such as 316 stainless steel and even aluminum can be utilized for these purposes subject only that the maximum pressure range of the finished tube is reduced in relation with tube strength. Maximum pressure range for 316 stainless steel and 7075-T6 aluminum tubes is believed to be about 10,000 psi and 17,000 psi respectively. Beryllium copper is less suitable due to a lack of elongation in the hard state and potential for sudden rupture in a fully hard condition. Aluminum is also less suitable due to known process and atmospheric corrosion risks. Engineered plastic, as described supra, can also be utilized for pressures of between about 500–5000 psi.

Referring now to FIG. 7, there is illustrated an alternative cross section for tube 12 that includes opposite and parallel side flats 70 and 72 about the tube exterior extending the substantial length of the tube. The flats are machined parallel to the direction in which the bore is eccentric and results in a sensor 12 with about a six percent increase in motion sensitivity and a fifteen percent reduction in operating stress as compared to the otherwise same construction illustrated in FIG. 5.

In FIG. 8, there is illustrated a calibration system for sensor tube 12 gun drilled to a depth L3 and temporarily sealed at a base 28. Bracket 42 is spot welded at 43 to tube free end 40 with lateral arm 44 being temporarily held at 45 (the nominal position for bracket 44) to bracket 42. A predetermined pressure, about ten to twenty percent of the desired operating range, is applied and motion of a selected aperture 74 is monitored and measured. Since the response is linear and predictable, telescopic extent (tip motion is proportional to the square of L1) for extending the tube end 26 inward of socket 28 can then be accurately calculated for establishing L1 in relation to inlet base 28. At that point, the tube inlet end 26 can conveniently be trimmed appropriately to remove excess length. Tube 12 is then welded or brazed in place after which arm 44 may be slid up or down typically ±0.5 inches to further refine the input motion to link 46. As a consequence, any error in establishing the L1 dimension after welding can be compensated for. The input motion to the link is influenced not only by L1 but by the composite dimension L1 plus the distance from the inward termination of the bore to the final attachment point of arm 44. The lighter "dead space" serves as an amplifier and is nearly as effective as would be extending the bore the same incremental distance. Finally, the provisions of multiple spaced attachment apertures 74 for linkage 46 provide a third and final input motion adjustment as an influence on linearity and lost motion. Once tube testing for sensitivity has been concluded, the bottom of tube 12 can conveniently be trimmed appropriately to remove excess length.

In the alternative, it is also possible for tube 12 to be machined integral with socket 28 and whether or not the tube and socket are integrally formed, to selectively rotate the tube relative to the gauge movement prior to affixing it in case 14 for fine tuning its output to a predetermined level.

As best seen in FIGS. 9 and 10 there is illustrated an alternative end-viewed visual indicator 76 for optional use in a pressure gauge. Indicator 76 includes an arcuate dial plate 78 behind an arcuate transparent window 80 and a displaceable pointer 83. The pointer has an arm 82 pivoted about hinge 84 connected in turn via a bracket 86 to the displaceable free end 40 of sensor tube 12. In response to pressure changes received by sensor tube 12, free end 40 is caused to displace forcing pointer arm 82 to pivot about hinge 84 for vertically displacing pointer end 83 past dial plate 78.

By the above description there is disclosed a novel sensor element capable of predictably responding to fluid pressure to which it is exposed and which can conveniently be deployed in a variety of utilization apparatuses including a pressure operative instrument such as a pressure gauge, switch mechanism, etc. The sensor element is particularly advantageous at high pressure ranges in excess of 40,000 psi although it could be economically utilized at lower pressures from about 500 psi and above. The sensor per se is of relatively simple construction so as to incur nominal production cost while it solves a long standing problem in manufacturing a sensor element and pressure gauges operable in the high pressure ranges. The simplicity should be readily apparent to those skilled in the art as compared to previous constructions utilized for similar purposes.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A pressure sensor element operative to monitor fluid pressure values to which it is exposed comprising:

an elongated tube having a first end and an opposite second end; said tube defining an internal bore having an open inlet at said first end of said tube at which to receive fluid of pressure to be monitored and closed at said opposite second end for said opposite second end to incur a predictable response in correlation to values of fluid pressure received at said first end;

said bore extending eccentrically within said tube on a center line offset a predetermined distance relative to the center line of the tube.

2. A sensor element in accordance with claim 1 in which said response by said opposite second end comprises a varied displacement correlated to values of fluid pressure received at said first end.

3. A sensor element in accordance with claim 2 in which said tube is characterized as having an instantaneous center of rotation about which a bending of said tube can occur for effecting displacement of said opposite second end.

4. A sensor element in accordance with claim 2 in which said tube is of a length relative to the outside diameter (OD) of the tube in the ratio of between about 30–60/1.

5. A sensor element in accordance with claim 2 in which the bore of said tube has an internal diameter (ID) relative to the outside diameter (OD) of the tube in a ratio of between about thirty five percent to about sixty five percent to one of the tube OD.

6. A sensor element in accordance with claim 2 in which the centerline offset of said bore relative to the internal diameter (ID) of the tube is in a ratio between about fifteen percent to about forty percent to one.

7. A sensor element in accordance with claim 2 in which the exterior of said tube includes opposite and parallel flats extending over a substantial length of said tube.

8. A sensor element in accordance with claim 2 in which said tube is of a composition characterized as having a relatively high tensile yield strength in combination with a relatively low Young's elastic modulus.

9. A sensor element in accordance with claim 8 in which the composition of said tube is selected from the group consisting of Inconel 718; Inconel X-750; K-500 Monel; Inconel 706; Beryllium Copper; 316 stainless steel; 7075-T6 aluminum and an engineered plastic.

10. An instrument responsive to predetermined values of fluid pressure comprising:

a pressure sensor element operative to monitor fluid pressure values to which it is exposed and including an elongated tube having a first end and an opposite second end, said tube defining an internal bore extending eccentrically within said tube from an open inlet at said first end at which to receive fluid of varying pressure to be monitored to a closed opposite second end for said opposite second end to incur a predictable response to be transmitted in correlation to values of fluid pressure received at said first end; and a utilization unit operatively connected to the said opposite second end of said sensor element and operative by the transmitted response of said opposite second end.

11. An instrument in accordance with claim 10 in which said instrument comprises a pressure gauge and said utilization unit comprises indicator indicia providing a visual indication of pressure values being transmitted from said sensor element.

12. An instrument is accordance with claim 11 including an amplifier operatively intervening between the opposite second end of said sensor element and the indicator indicia of said gauge.

13. An instrument in accordance with claim 10 in which said instrument comprises a switch mechanism and said utilization unit comprises a switch operable by the transmitted response of at least one predetermined value of fluid pressure received at said first end of the tube of said sensor element.

14. A sensor element in accordance with claim 1 in which said elongated tube in the absence of being fluid pressure received at said first end extends substantially rectilinearly and on receipt of fluid pressure at said first end is caused to deflect about the vicinity of said opposite second end an amount correlated to the values of fluid pressure received at said first end.

15. A sensor element in accordance with claim 14 in which said sensor element is characterized as being operable at pressures in excess of about 40,000 psi.

16. An instrument in accordance with claim 10 in which said elongated tube of said sensor element in the absence of fluid pressure being received at said first end extends substantially rectilinearly and on receipt of fluid pressure at said first end is caused deflect about the vicinity of said opposite second end an amount correlated to the values of fluid pressure received at said first end.

17. An instrument in accordance with claim 16 in which said sensor element is characterized as being operable at pressures in excess of about 40,000 psi.

* * * * *